(12) United States Patent
Diehl et al.

(10) Patent No.: US 10,746,903 B2
(45) Date of Patent: Aug. 18, 2020

(54) GRADIENT INDEX (GRIN) SPOKE LENS AND METHOD OF OPERATION

(71) Applicant: THE BOEING COMPANY, Chicago, IL (US)

(72) Inventors: Colin Anthony Minor Diehl, Huntsville, AL (US); Corey McKinney Thacker, Madison, AL (US)

(73) Assignee: THE BOEING COMPANY, Chicago, IL (US)

( * ) Notice: Subject to any disclaimer, the term of this patent is extended or adjusted under 35 U.S.C. 154(b) by 33 days.

(21) Appl. No.: 15/710,159

(22) Filed: Sep. 20, 2017

(65) Prior Publication Data

US 2019/0086581 A1 Mar. 21, 2019

(51) Int. Cl.
| | |
|---|---|
| *G02B 3/00* | (2006.01) |
| *G02B 9/00* | (2006.01) |
| *H01Q 19/06* | (2006.01) |
| *H01Q 15/04* | (2006.01) |
| *G02B 1/00* | (2006.01) |

(52) U.S. Cl.
CPC ........... *G02B 3/0087* (2013.01); *G02B 1/002* (2013.01); *H01Q 15/04* (2013.01); *H01Q 19/062* (2013.01); *G02B 2003/0093* (2013.01)

(58) Field of Classification Search
CPC .... G02B 3/0087; G02B 3/0056; G02B 3/243; G02B 3/07; G02B 19/0061; H01Q 3/44; H01Q 3/15; A61L 24/0089; A61L 2400/06; A61L 2430/02; A61L 24/02
USPC ......................................................... 359/654
See application file for complete search history.

(56) References Cited

U.S. PATENT DOCUMENTS

| | | | |
|---|---|---|---|
| 2,677,766 A | 5/1954 | Litchford | |
| 3,404,405 A | 10/1968 | Young | |
| 4,232,321 A | 11/1980 | Ohm | |
| 5,218,322 A | 6/1993 | Allison et al. | |
| 7,385,462 B1 | 6/2008 | Epp et al. | |
| 9,437,184 B1 | 9/2016 | Swett | |

(Continued)

FOREIGN PATENT DOCUMENTS

| | | |
|---|---|---|
| EP | 2750246 A1 | 7/2014 |
| EP | 3012916 A1 | 4/2016 |

(Continued)

OTHER PUBLICATIONS

Zhang, et al., "3D-printed flat lens for microwave applications", IEEE Xplore Document, Nov. 2-3, 2015, 3 pages.

(Continued)

*Primary Examiner* — William R Alexander
*Assistant Examiner* — Tamara Y. Washington
(74) *Attorney, Agent, or Firm* — Moore IP Law (57) ABSTRACT

An apparatus includes a center portion and a plurality of spoke portions that are in contact with the center portion and that extend to a perimeter region. The plurality of spoke portions include at least a first monolithic spoke portion extending from the center portion to the perimeter region, and the center portion and the plurality of spoke portions define a plurality of cavity regions among the plurality of spoke portions. The center portion, the plurality of spoke portions, and the plurality of cavity regions are included in a gradient index (GRIN) lens having a plurality of effective dielectric constants that are based on a radial distance from the center portion.

20 Claims, 6 Drawing Sheets

(56) References Cited

U.S. PATENT DOCUMENTS

| | | |
|---|---|---|
| 9,979,459 B2 | 5/2018 | Savage et al. |
| 10,291,312 B2 | 5/2019 | Savage et al. |
| 2003/0006941 A1 | 1/2003 | Ebling et al. |
| 2003/0043086 A1 | 3/2003 | Schaffner et al. |
| 2006/0098272 A1 | 5/2006 | Lerner et al. |
| 2007/0216596 A1 | 9/2007 | Lewis et al. |
| 2016/0322703 A1* | 11/2016 | Jesme .................. B29C 64/106 |

FOREIGN PATENT DOCUMENTS

| | | |
|---|---|---|
| EP | 2573872 A1 | 3/2017 |
| WO | 2015102938 A1 | 7/2015 |

OTHER PUBLICATIONS

Extended European Search Report for Application No. 1818979.5 dated Feb. 18, 2019, 8 pgs.

Allen, J. W., et al., "Design and fabrication of an RF GRIN lens 3D printing technology", Proc. of SPIE, vol. 8624, Feb. 20, 2013, 8 pgs.

European Patent Office Extended Search Report, Application No. 17175267.8-1927, dated Oct. 19, 2017.

U.S. Appl. No. 16/125,436, filed Sep. 7, 2018.

Delgado, Guillermo et al., "Scanning Properties of Teflon Lenses," Microwave and Optical Technology Letters, vol. 11, No. 5, Apr. 5, 1996, pp. 271-273.

Jain, Sidharath, et al., "Flat-Base Broadband Multibeam Luneburg Lens for Wide Angle Scan," Cornell University, May 4, 2013, arXiv.org > physics > arXiv:1305.0964.

Schoenlinner, Bernhard, "Compact Wide Scan-Angle Antennas for Automotive Applications and RF MEMS. Switchable Frequency-Selective Surfaces," A dissertation submitted in partial fulfillment of the requirements for the degree of Doctor of Philosophy, The University of Michigan, 2004, 72 pgs.

Schoenlinner, Bernhard, "Wide-Scan Spherical-Lens Antennas for Automotive Radars," IEEE Transactions on Microwave theory and Techniquest, vol. 50, No. 9, Sep. 2002, pp. 2166-2175. 1 1.

Tribe, J. et al., "Additively manufactured hetrogeneous substrates for three-dimensional control of permittivity," Electronics Letters, May 8, 2014; vol. 50, No. 10, pp. 745-746.

* cited by examiner

GRADIENT INDEX (GRIN) SPOKE LENS AND METHOD OF OPERATION

FIELD

The present disclosure generally relates to lenses that focus electromagnetic signals.

BACKGROUND

Electronic devices may communicate using electromagnetic (EM) signals. For example, data may be represented using an EM signal, and the EM signal may be provided from an antenna of one electronic device to an antenna of another electronic device via a communication network, such as a wireless network.

For long distance communication, an EM signal from an antenna may be focused using a dish structure (e.g., a parabolic dish) or a lens, such as a gradient index (GRIN) lens. A dish structure or a lens may be heavy and large, which may increase cost. Reducing the size of a dish structure or a lens may reduce the gain of the EM signal, which will degrade signal quality of the EM signal.

SUMMARY

In an illustrative example, an apparatus includes a center portion and a plurality of spoke portions that are in contact with the center portion and that extend to a perimeter region. The plurality of spoke portions include at least a first monolithic spoke portion extending from the center portion to the perimeter region, and the center portion and the plurality of spoke portions define a plurality of cavity regions among the plurality of spoke portions. The center portion, the plurality of spoke portions, and the plurality of cavity regions are included in a gradient index (GRIN) lens having a plurality of effective dielectric constants that are based on a radial distance from the center portion.

In another example, a method includes receiving an electromagnetic waveform at a GRIN lens. The method further includes modifying the electromagnetic waveform at the GRIN lens based on a plurality of effective dielectric constants. The plurality of effective dielectric constants are based on a radial distance from a center portion of the GRIN lens and are further based on a plurality of cavity regions defined by the center portion and a plurality of spoke portions of the GRIN lens. The plurality of spoke portions include at least a first monolithic spoke portion extending from the center portion to a peripheral region of the GRIN lens.

In another example, an apparatus includes a center portion and a plurality of spoke portions that are in contact with the center portion and that extend to a perimeter region. The center portion and the plurality of spoke portions define a plurality of cavity regions among the plurality of spoke portions. The plurality of cavity regions include at least a first monolithic cavity region extending from the center portion to the perimeter region. The center portion, the plurality of spoke portions, and the plurality of cavity regions are included in a GRIN lens having a plurality of effective dielectric constants that are based on a radial distance from the center portion.

The described features, functions, and advantages may be achieved independently in various embodiments or may be combined in yet other embodiments further details of which can be seen with reference to the following description and drawings.

DETAILED DESCRIPTION

In an illustrative example, a gradient index (GRIN) lens has a "hub and spoke" configuration. The GRIN lens may be manufactured using a 3D printing process, reducing cost associated with the GRIN lens. For example, a number and width of spokes of the GRIN lens may be changed to modify the functional frequency of the GRIN lens, reducing cost and complexity as compared to generating a new lens configuration for each frequency.

Spokes of the GRIN lens have tapered profiles. For example, widths of the GRIN lens may decrease as a function of radial distance from the hub of the GRIN lens. As a result, an effective dielectric constant of the GRIN lens varies "continuously" as a function of the radial distance, improving performance of the lens as compared to certain conventional GRIN lenses that have "discrete" changes in a dielectric constant.

Figure 1:
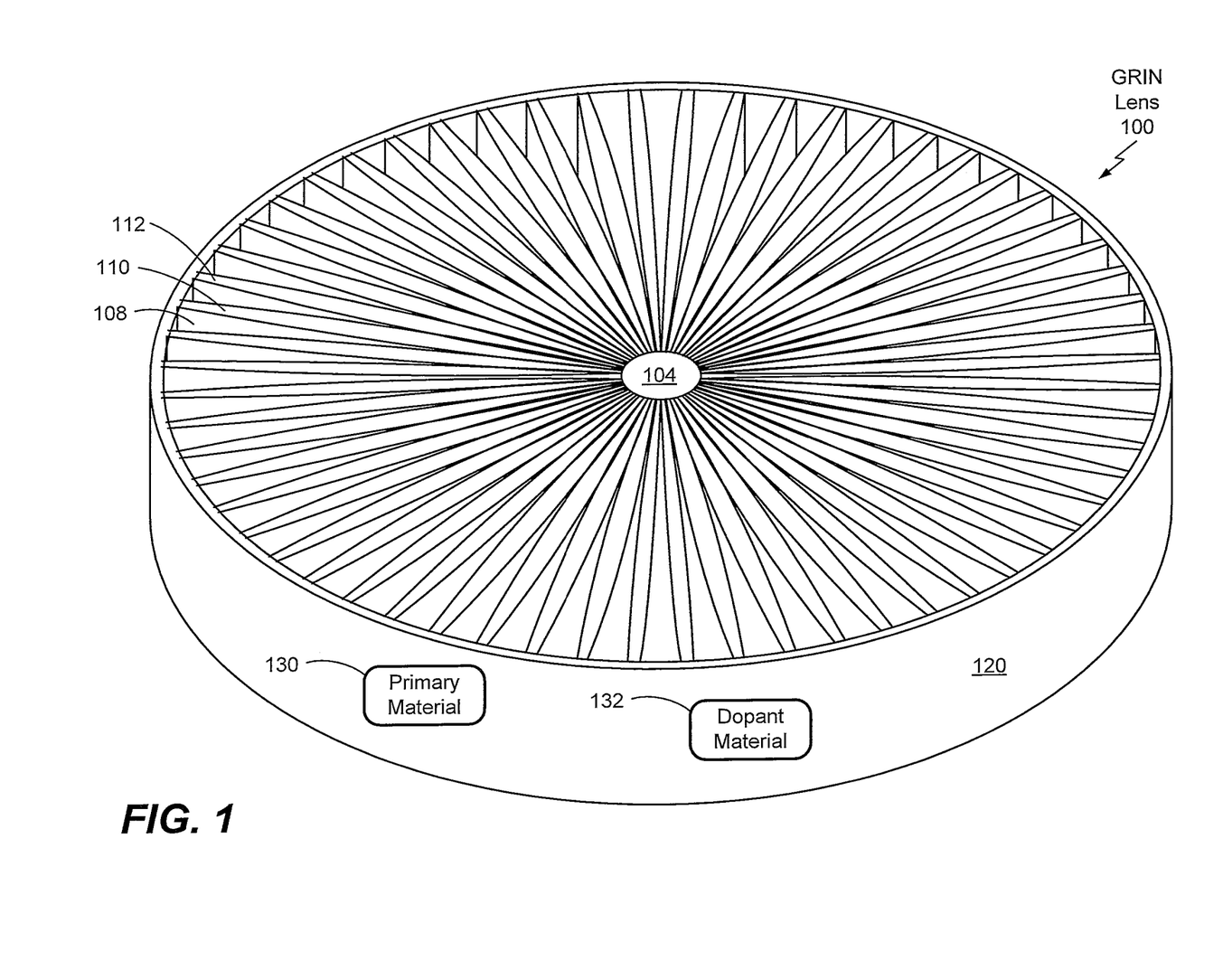
FIG. 1 is a diagram that illustrates a perspective view of certain aspects of an example of a gradient index (GRIN) lens having a hub-and-spoke configuration.

FIG. 1 illustrates certain aspects of a particular illustrative example of a gradient index (GRIN) lens 100. The GRIN lens 100 has a hub-and-spoke configuration and is configured to focus electromagnetic radiation based on a "continuously" varying dielectric constant that changes based on radial distance from a center portion 104 of the GRIN lens 100 (e.g., instead of a "discrete" or "stepwise" change of dielectric constant as in certain conventional GRIN devices).

In a particular example, the GRIN lens 100 is included in a communication system. For example, the GRIN lens 100 may be configured to focus an electromagnetic (EM) signal provided from a transmitter antenna. Alternatively or in addition, the GRIN lens 100 may be configured to focus an EM signal that is received from a transmitter antenna (e.g., via a communication network) and that is to be provided to a receiver antenna. In an illustrative example, a system includes an antenna configured to transmit or to receive an EM signal through the GRIN lens 100.

The GRIN lens 100 includes the center portion 104 and a plurality of spoke portions that are in contact with the center portion 104. For example, the plurality of spoke portions include a first spoke portion 108 and a second spoke portion 112.

The center portion 104 and the plurality of spoke portions define a plurality of cavity regions among the plurality of spoke portions. For example, the first spoke portion 108 and the second spoke portion 112 define a cavity region 110. In an illustrative example, the plurality of cavity regions correspond to air gaps or vacuum gaps. In another implementation, one or more of the plurality of cavity regions may be filled with or may include a material, such as a second material (e.g., a plastic or another material) that is different than a first material included in the plurality of spoke portions. The second material may have a different dielectric constant than the first material.

The plurality of spoke portions extend to a perimeter region of the GRIN lens 100. In the example of FIG. 1, the GRIN lens 100 includes an outer ring structure 120. In other implementations, the outer ring structure 120 may be omitted. In FIG. 1, the outer ring structure 120 is coupled to the plurality of spoke portions and defines the perimeter region of the GRIN lens 100.

In a particular example, the center portion 104 is associated with a dielectric constant that is greater than dielectric constants associated with the plurality of spoke portions of the GRIN lens 100. In this example, the GRIN lens 100 may correspond to a convex lens and may be configured to focus an electromagnetic signal. In another example, the GRIN lens may correspond to another lens, such as a concave lens. In this case, the center portion 104 may be associated with a dielectric constant that is less than dielectric constants associated with the plurality of spoke portions of the GRIN lens 100. In addition, the plurality of spoke portions of the GRIN lens 100 may taper towards the center portion 104 or the outer ring structure 120 (e.g., widths of the plurality of spoke portions may increase or decrease with radial distance from the center portion 104). In some implementations, the outer ring structure 120 is omitted from the GRIN lens 100 (e.g., the plurality of spoke portions connect at the center portion 104 but not at the perimeter of the GRIN lens 100). In other implementations, the center portion 104 is omitted from the GRIN lens 100 (e.g., the plurality of spoke portions connect at the outer ring structure 120 but not at the center of the GRIN lens 100).

The plurality of spoke portions includes at least a first monolithic spoke portion. In a particular example, each spoke portion of the plurality of spoke portions corresponds to a monolithic spoke portion extending from the center portion 104 to the perimeter region. As used herein, a "monolithic" spoke portion refers to a spoke portion that includes a contiguous region including at least some material forming a straight line. Certain illustrative examples of monolithic spoke portions are described further with reference to FIG. 2.

The GRIN lens 100 has a plurality of effective dielectric constants that are based on a radial distance from the center portion 104 (e.g., where each radius of the GRIN lens 100 is associated with a particular effective dielectric constant). As used herein, an "effective" dielectric constant refers to an average dielectric constant associated with a portion of the GRIN lens 100, where the average dielectric constant is affected by dielectric constants of other portions of the GRIN lens 100. For example, an effective dielectric constant may be determined using a weighted average that weights other dielectric constants based on proximity to the portion. In a particular example, an effective dielectric constant is affected by a dielectric constant of one or more materials used to fabricate the GRIN lens 100 and by a dielectric constant of a cavity of the GRIN lens 100 (which may be approximately equal to one).

In a particular example, spoke portions of the GRIN lens 100 have a tapered profile, where a width of a spoke portion varies based on radial distance from the center portion 104 to form the tapered profile. As a result, in this example, the plurality of effective dielectric constants include a continuous range of effective dielectric constants based on tapered profiles of the plurality of spoke portions. To further illustrate, "smooth" tapering of the plurality of spoke portions may result in "smooth" transitions of effective dielectric constants of the GRIN lens 100 (e.g., instead of discontinuous or stepwise changes in effective dielectric constants). Certain illustrative examples of dielectric constants associated with the GRIN lens 100 are described further with reference to FIG. 4.

The GRIN lens 100 may have a height L. In some implementations, the height L may be substantially constant at each portion of the GRIN lens 100. In other implementations, the height L may vary according to radial distance from the center portion 104, such as if the height L increases or decreases with radial distance from the center portion 104.

In a particular example, a number of spoke portions included in the GRIN lens 100 is related to a frequency associated with the GRIN lens 100. For example, the number of spoke portions may be selected based on a particular frequency or frequency range of a signal that is to be provided to the GRIN lens 100.

In a particular example, the GRIN lens 100 is configured to focus (e.g., collimate) an EM signal that is to be transmitted or that is received via a communication network, such as an optical communication network. The GRIN lens 100 may be configured to focus EM radiation to transmit or to receive a far-field high-gain signal.

In a particular example, the GRIN lens 100 is fabricated using an additive computerized manufacturing process, such as a 3D printing process or a sintering process, as illustrative examples. Alternatively or in addition, the GRIN lens 100 may be fabricated using a subtractive computerized manufacturing process, such as a milling process, as an illustrative example. In a particular example, the GRIN lens 100 is fabricated using a combination of one or more additive computerized manufacturing processes and one or more additive and one or more subtractive computerized manufacturing processes, such as a combined photolithographic and etching process, as an illustrative example.

The GRIN lens 100 may be manufactured using a single material or using multiple materials (e.g., using a primary material and one or more dopant materials, as an illustrative example). To illustrate, in the example of FIG. 1, the GRIN lens 100 includes a primary material 130 and a dopant material 132. Although the example of FIG. 1 depicts the primary material 130 and the dopant material 132 as being included in the outer ring structure 120, it should be appreciated that the primary fill material 130 and the dopant material 132 may be included in one or more of the spoke portions of the GRIN lens 100 or the center portion 104 of the GRIN lens 100 (alternatively or in addition to being included in the outer ring structure 120).

The GRIN lens 100 has a dielectric constant that is based on distance from the center portion 104 and according to a gradient function. For example, the dielectric constant may decrease with greater distance from the center portion 104. Depending on the particular application, the GRIN lens 100 may be implemented as a compact and lightweight antenna (e.g., as an alternative to a heavy parabolic dish antenna), as a low-profile, high-gain antenna for a mobile device, as a low-power switched beam antenna (e.g., as an alternative to a phased array), as a horn antenna, as another device, or a combination thereof.

The GRIN lens 100 of FIG. 1 may reduce costs associated with certain devices. For example, the GRIN lens 100 may be implemented in place of a larger device (e.g., a heavy parabolic dish antenna), which may reduce cost and complexity of a transmitter device, a receiver device, or both.

Figure 2:
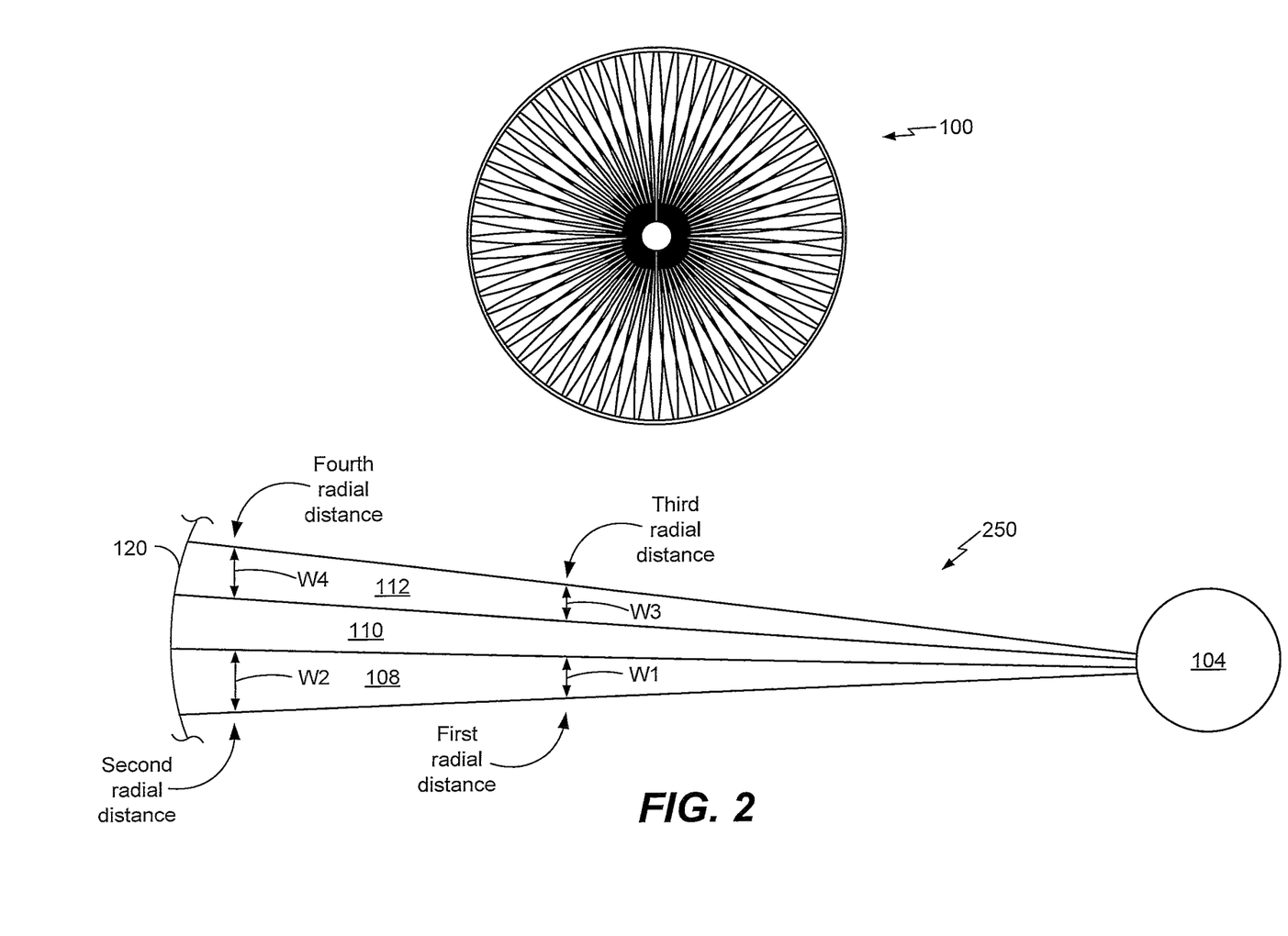
FIG. 2 is another diagram that illustrates a plan view of certain aspects of the GRIN lens of FIG. 1 and that further illustrates a detailed view of aspects of the GRIN lens of FIG. 1.

FIG. 2 illustrates a plan view of certain aspects of the GRIN lens 100 of FIG. 1. FIG. 2 further illustrates a detailed view 250 of a portion of the GRIN lens of FIG. 1.

The detailed view 250 depicts certain illustrative aspects of the first spoke portion 108, the cavity region 110, and the second spoke portion 112. In FIG. 2, the spoke portions 108, 112 correspond to monolithic spoke portions extending from the center portion 104 to the outer ring structure 120. FIG. 2 also depicts that the cavity region 110 corresponds to a monolithic cavity region extending from the center portion 104 to the outer ring structure 120. As used herein, a "monolithic" cavity region may refer to a contiguous cavity region.

The spoke portions 108, 112 each have a tapered profile that varies according to a radial distance from the center portion 104. For example, in FIG. 2, a first width W1 of the first spoke portion 108 at a first radial distance from the center portion 104 is different than a second width W2 of the first spoke portion 108 at a second radial distance from the center portion 104. To illustrate, the first radial distance may be less than the second radial distance, and the first width W1 may be less than the second width W2. As another example, a third width W3 of the second spoke portion 112 at a third radial distance from the center portion 104 is different than a fourth width W4 of the second spoke portion 112 at a fourth radial distance from the center portion 104. For example, the third radial distance may be less than the fourth radial distance, and the third width W3 may be less than the fourth width W4. In a particular example, the first width W1 corresponds to the third width W3, and the first radial distance corresponds to the third radial distance. In a particular example, the second width W2 corresponds to the fourth width W4, and the second radial distance corresponds to the fourth radial distance.

Further, in the example of FIG. 2, the spoke portions 108, 112 each have a "dual" tapered profile in which cross-sectional area of the spoke portions 108, 112 increases with radial distance from the center portion 104 up to a particular distance from the center portion 104 and then decreases with radial distance beyond the particular distance. For example, in FIG. 2, a fifth width W5 of the first spoke portion 108 at a fifth radial distance from the center portion 104 is less than the second width W2. As another example, a sixth width W6 of the second spoke portion 112 at a sixth radial distance from the center portion 104 is less than the fourth width W4.

Although FIG. 2 depicts particular shapes of the spoke portions 108, 112, it should be appreciated that other examples are within scope of the disclosure. For example, instead of a "dual" tapered profile, the spoke portions 108, 112 may have a "single" tapered profile (e.g., where cross-sectional area of the spoke portions 108, 112 increases with distance from the center portion 104 throughout the extent of the spoke portions 108, 112). As another example, the spoke portions 108, 112 may have a "reverse" dual tapered profile (e.g., where cross-sectional area of the spoke portions 108, 112 decreases with radial distance from the center portion 104 up to a particular distance from the center portion 104 and then increases with radial distance beyond the particular distance). In other examples, the spoke portions 108, 112 may have one or more other shapes.

In a particular example, the GRIN lens 100 has an infill ratio g (e.g., where g indicates a ratio of spoke portion volume to cavity volume of the GRIN lens 100). The infill ratio g is based on one or more of a number of spoke portions of the GRIN lens 100 or a width of spoke portions of the GRIN lens 100. As an illustrative example, the infill ratio g may be determined according to g=(Nw)/(2πr), where N indicates the number of spokes of the GRIN lens 100, and where w indicates a spoke width at a particular radius r of the GRIN lens 100.

The GRIN lens 100 may have a self-focusing (SELFOC) configuration with an effective dielectric constant of $\varepsilon\_lens=\varepsilon\_0(1-(\alpha/2)r^2)$, where r indicates a particular radius of the GRIN lens 100, where $\varepsilon\_0$ indicates the dielectric constant of the center portion 104 of the GRIN lens 100 (e.g., the dielectric constant of the material used to fabricate the GRIN lens 100), and where α indicates a constant (e.g., a value determined based on "maximum" and "minimum" dielectric constants associated with the GRIN lens 100). In a particular example, $\alpha=2(\varepsilon\_0-\varepsilon\_min)/(\varepsilon\_0(R^1))$, where $\varepsilon\_min$ indicates the "minimum" dielectric constant at the edge of the GRIN lens 100 (e.g., the effective dielectric constant of the outer ring structure 120), and where R indicates the "maximum" radius of the GRIN lens 100 (e.g., the radial distance from the center portion 104 to the outer ring structure 120).

Widths of spoke portions of the GRIN lens 100 may be determined based on the infill ratio g, based on the effective dielectric constant $\varepsilon\_lens$, based on one or more other parameters, or a combination thereof. In a particular example, an effective permittivity $\varepsilon\_eff$ of the GRIN lens 100 corresponds to $\varepsilon\_eff = g(\varepsilon\_0-1)+1$. The effective permittivity $\varepsilon\_eff$ may be set to a particular value (e.g., a desired effective permittivity of the GRIN lens 100), and widths of spoke portions of the GRIN lens 100 may be determined based on Equation 1:

$$w = \frac{2\pi r(\varepsilon_0^2 R^2 - \varepsilon_0 R^2 - \varepsilon_0^2 r^2 + \varepsilon_0 \varepsilon_{min} r^2)}{(\varepsilon_0 - 1)\varepsilon_0 N R^2}. \quad \text{(Equation 1)}$$

In a particular illustrative example, the height of the GRIN lens 100 may be selected to determine a particular focal length of the GRIN lens 100. To illustrate, in a particular example, a back focal length (bfl) may correspond to a distance from the back plane of the GRIN lens 100 to the focal point of the GRIN lens 100. In a non-limiting illustrative example, bfl=1/N*sqrt(α)*tan(L*sqrt(α))), where L indicates the height of the GRIN lens 100. In other examples, the focal length of the GRIN lens 100 may be different and may be determined using one or more other parameters.

One or more aspects described with reference to FIG. 2 may reduce costs associated with certain devices. For example, one or more aspects of FIG. 2 may be used to design certain aspects of the GRIN lens 100 to meet particular specifications. As an illustrative example, an effective permittivity may be achieved (or changed) by selecting (or changing) widths of spoke portions of the GRIN lens 100 in accordance with Equation 1, which may reduce cost and complexity as compared to a technique that redesigns a lens for each different effective permittivity.

Figure 3:
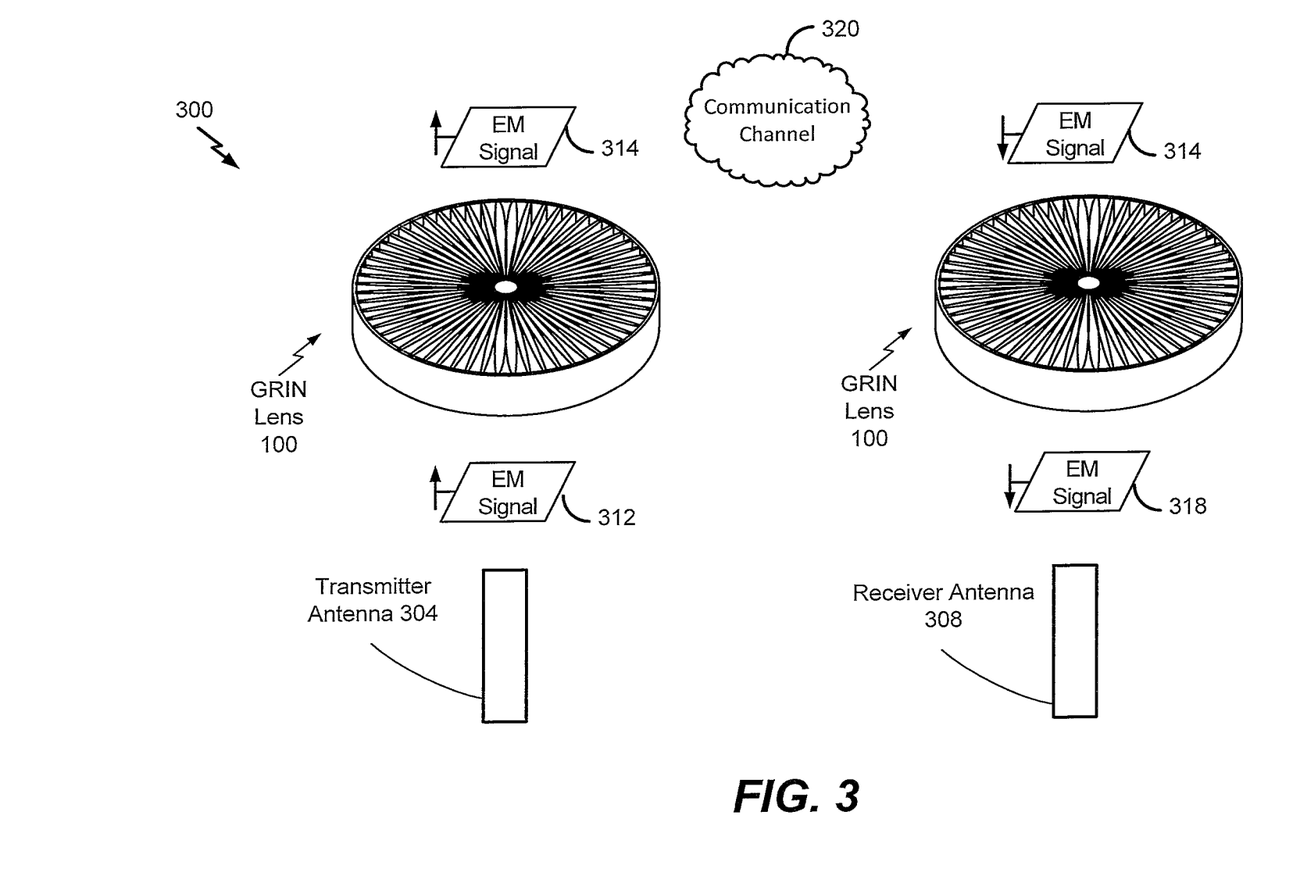
FIG. 3 is a diagram that illustrates an example of a communication system that includes the GRIN lens of FIG. 1.

FIG. 3 illustrates an example of a communication system 300 that includes one or more GRIN lenses corresponding to the GRIN lens of FIG. 1.

The communication system 300 includes a transmitter antenna 304. In FIG. 3, the transmitter antenna 304 is configured to generate an EM signal 312 and to provide the EM signal 312 to a GRIN lens, such as the GRIN lens 100 of FIG. 1. The GRIN lens 100 is configured to modify the EM signal 312 (e.g., by focusing the EM signal 312) to generate an EM signal 314.

The EM signal 314 may be provided to one or more receiver devices via a communication channel 320 (e.g., a wireless communication channel or a fiber optic communication channel, as illustrative examples). For example, a GRIN lens (e.g., the GRIN lens 100) may be configured to receive the EM signal 314 via the communication channel 320 and to modify the EM signal 314 (e.g., by focusing the EM signal 314) to generate an EM signal 318. The EM signal 318 may correspond to the EM signal 312. The EM signal 318 may be provided to a receiver antenna 308.

One or more aspects of the communication system 300 of FIG. 3 may reduce costs associated with certain devices. For example, the GRIN lens 100 may be implemented in place of a larger device (e.g., a heavy parabolic dish antenna) in the communication system 300, which may reduce cost and complexity of a transmitter device, a receiver device, or both.

Figure 4:
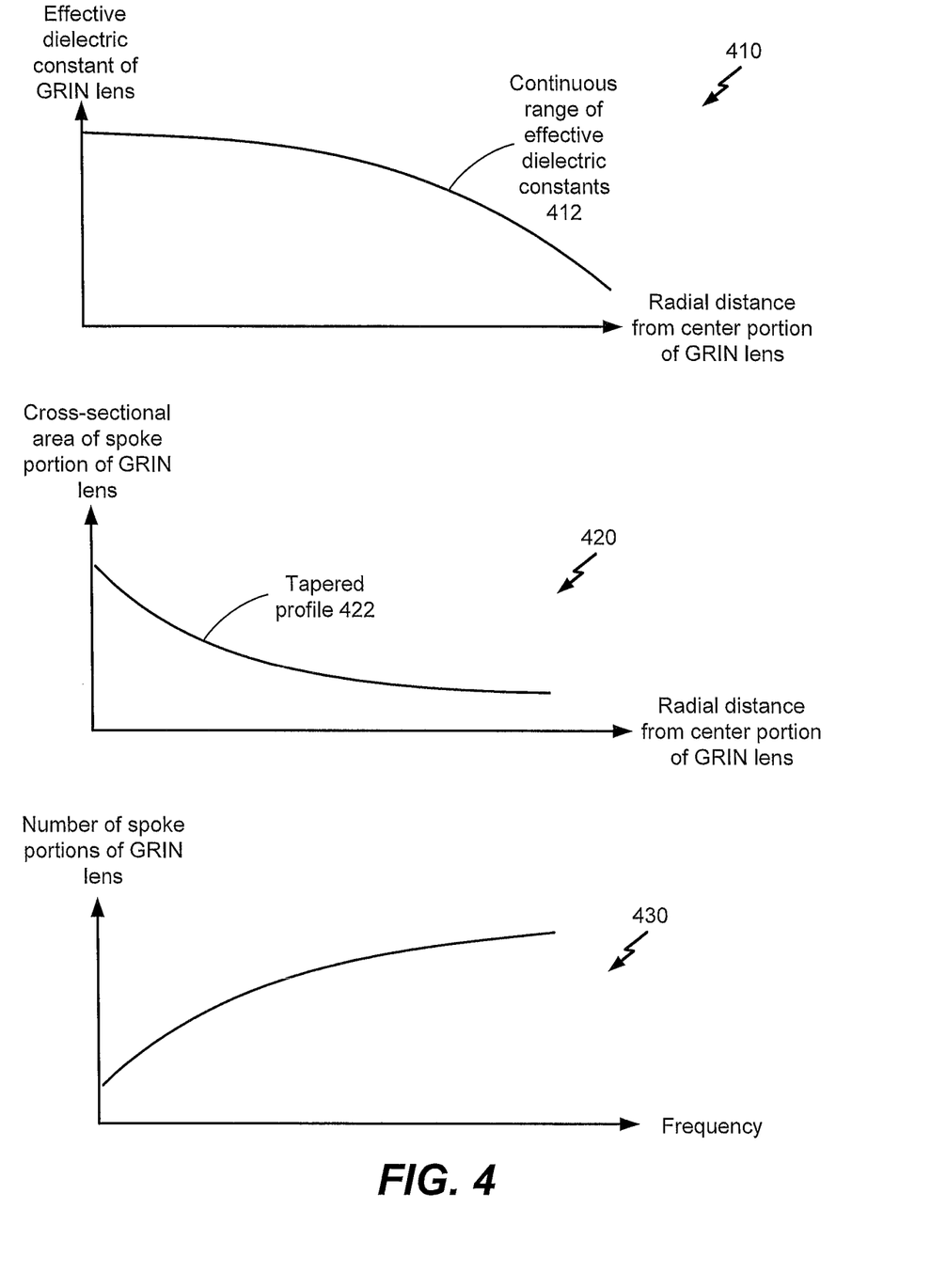
FIG. 4 is a diagram that illustrates graphs associated with certain examples of the GRIN lens of FIG. 1.

FIG. 4 is a diagram that illustrates graphs associated with certain examples of the GRIN lens of FIG. 1. It should be appreciated that the graphs of FIG. 4 are provided for illustration and that other examples are also within the scope of the disclosure.

FIG. 4 depicts a first graph 410. The abscissa of the first graph 410 corresponds to radial distance from the center portion 104 of the GRIN lens 100, and the ordinate of the first graph 410 corresponds to effective dielectric constant of the GRIN lens 100. The first graph 410 illustrates that the GRIN lens 100 may have a continuous range of effective dielectric constants 412. The example of FIG. 4 illustrates that the continuous range of effective dielectric constants 412 may have a parabolic or substantially parabolic distribution. In other implementations, the continuous range of effective dielectric constants 412 may have another distribution, such as an axial distribution of the continuous range of effective dielectric constants 412 or a radial distribution of the continuous range of effective dielectric constants 412, as illustrative examples.

FIG. 4 also depicts a second graph 420. The second graph 420 may correspond to one or more spoke portions of the GRIN lens 100. The abscissa of the second graph 420 corresponds to radial distance from the center portion 104, and the ordinate of the second graph 420 corresponds to cross-sectional area of a spoke portion of the GRIN lens 100. The second graph 420 illustrates that a spoke portion of the GRIN lens 100 may have a tapered profile 422, where cross-sectional area of the spoke portion decreases with radial distance from the center portion 104. The example of FIG. 4 illustrates that the tapered profile 422 may have an exponentially decreasing or substantially exponentially decreasing distribution. In other implementations, the tapered profile 422 may have another distribution (e.g., a linear distribution or another distribution).

FIG. 4 further depicts a third graph 430. The abscissa of the third graph 430 corresponds to frequency associated with the GRIN lens 100, and the ordinate of the third graph 430 corresponds to a number of spoke portions of the GRIN lens 100. For example, increasing a number of spoke portions of the GRIN lens 100 may result in a greater frequency associated with the GRIN lens 100. Increasing a number of spoke portions of the GRIN lens 100 may also decrease widths of the spoke portions and decrease size of cavities between the spoke portions, increasing homogeneity of the GRIN lens 100. In some applications, increased homogeneity of the GRIN lens 100 results in greater transmission of higher frequencies of an EM signal (as compared to decreasing homogeneity by decreasing spoke width). The example of FIG. 4 illustrates that the frequency associated with the GRIN lens 100 may logarithmically increase with the number of spokes of the GRIN lens 100. In other implementations, the frequency may be associated with another distribution (e.g., a linear distribution or another distribution).

One or more aspects of FIG. 4 may reduce costs associated with certain devices. For example, a frequency associated with the GRIN lens 100 may be achieved (or changed) by selecting (or changing) a number of spoke portions of the GRIN lens 100 in accordance with the third graph 430, which may reduce cost and complexity as compared to a technique that redesigns a lens for each different frequency.

Figure 5:
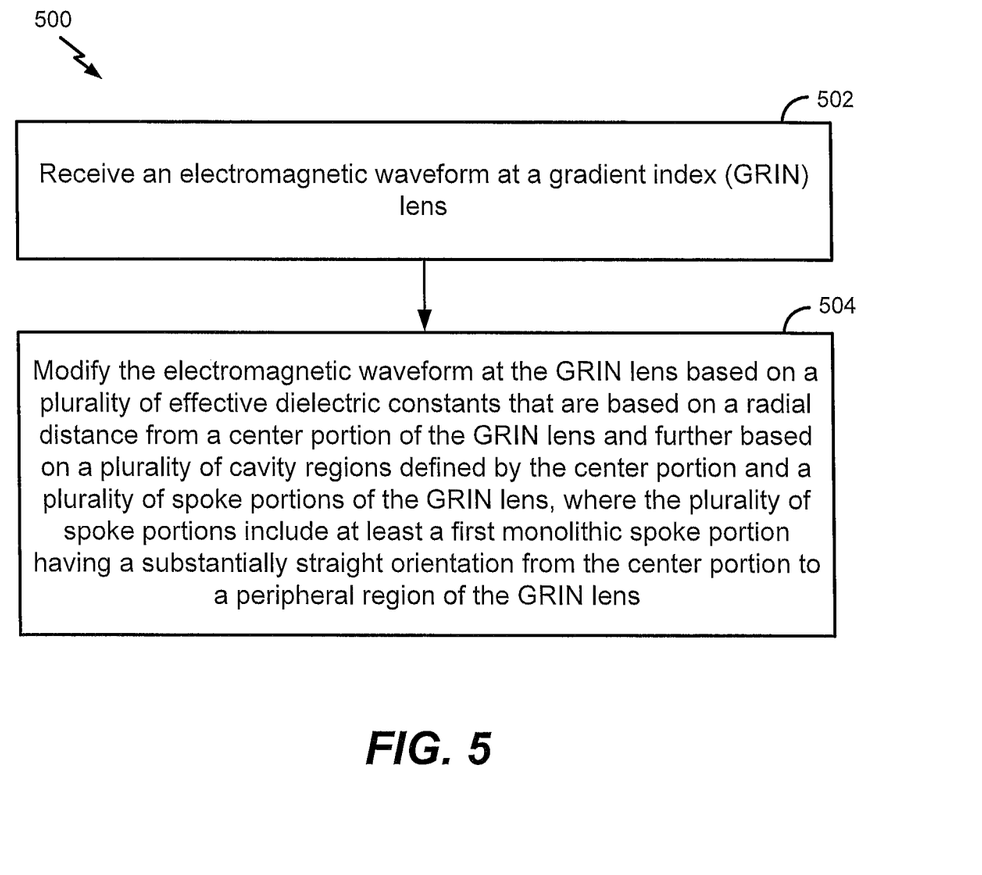
FIG. 5 is a flow chart illustrating an example of a method of operation of the GRIN lens of FIG. 1.

FIG. 5 is a flow chart illustrating an example of a method 500 of operation of the GRIN lens of FIG. 1.

The method 500 includes receiving an electromagnetic waveform at a GRIN lens, at 502. For example, the GRIN lens 100 may receive the EM signal 312 from the transmitter antenna 304. As another example, the GRIN lens 100 may receive the EM signal 314 from a transmitter device via the communication channel 320.

The method 500 further includes modifying the electromagnetic waveform at the GRIN lens based on a plurality of effective dielectric constants, at 504. For example, the GRIN lens 100 may modify the EM signal 312 to generate the EM signal 314. As another example, the GRIN lens 100 may modify the EM signal 314 to generate the EM signal 318.

The plurality of effective dielectric constants are based on a radial distance from a center portion of the GRIN lens. The plurality of effective dielectric constants are further based on a plurality of cavity regions defined by the center portion and a plurality of spoke portions of the GRIN lens. For example, the continuous range of effective dielectric constants 412 are based on a radial distance from the center portion 104 and are further based on dielectric constants associated with a plurality of cavity regions that includes the cavity region 110 and a plurality of spoke portions that includes the spoke portions 108, 112. The plurality of dielectric constants may be based on a dielectric constant of a material used to fabricate the GRIN lens and may be further based on a dielectric constant associated with the plurality of cavities (e.g., a dielectric constant of approximately one). The plurality of spoke portions include at least a first monolithic spoke portion extending from the center portion to a peripheral region of the GRIN lens. For example, one or both of the spoke portions 108, 112 may correspond to monolithic spoke portions extending from the center portion 104 to the outer ring structure 120.

In a particular example, the method 500 may further include transmitting the electromagnetic waveform to a receiver antenna (e.g., via a communication channel, such as the communication channel 320). For example, the transmitter antenna 304 may transmit the electromagnetic waveform to the receiver antenna 308. In another example, the electromagnetic waveform is received from a transmitter antenna via a communication channel. For example, the GRIN lens 100 may receive the EM signal 314 from the transmitter antenna 304 via the communication channel 320.

In a particular example, the plurality of effective dielectric constants include a continuous range of effective dielectric constants, such as the continuous range of effective dielectric constants 412. In an illustrative example, a number of the plurality of spoke portions is related to a frequency of the electromagnetic waveform. As a particular non-limiting example, the number of spoke portions of the GRIN lens 100 may be selected based on a frequency of the electromagnetic waveform in accordance with the third graph 430 of FIG. 4. To further illustrate, increasing a number of spoke portions of the GRIN lens 100 may decrease widths of the spoke portions and may decrease size of cavities between the spoke portions, increasing homogeneity of the GRIN lens 100 and resulting in greater transmission of higher frequencies of an EM signal.

Figure 6:
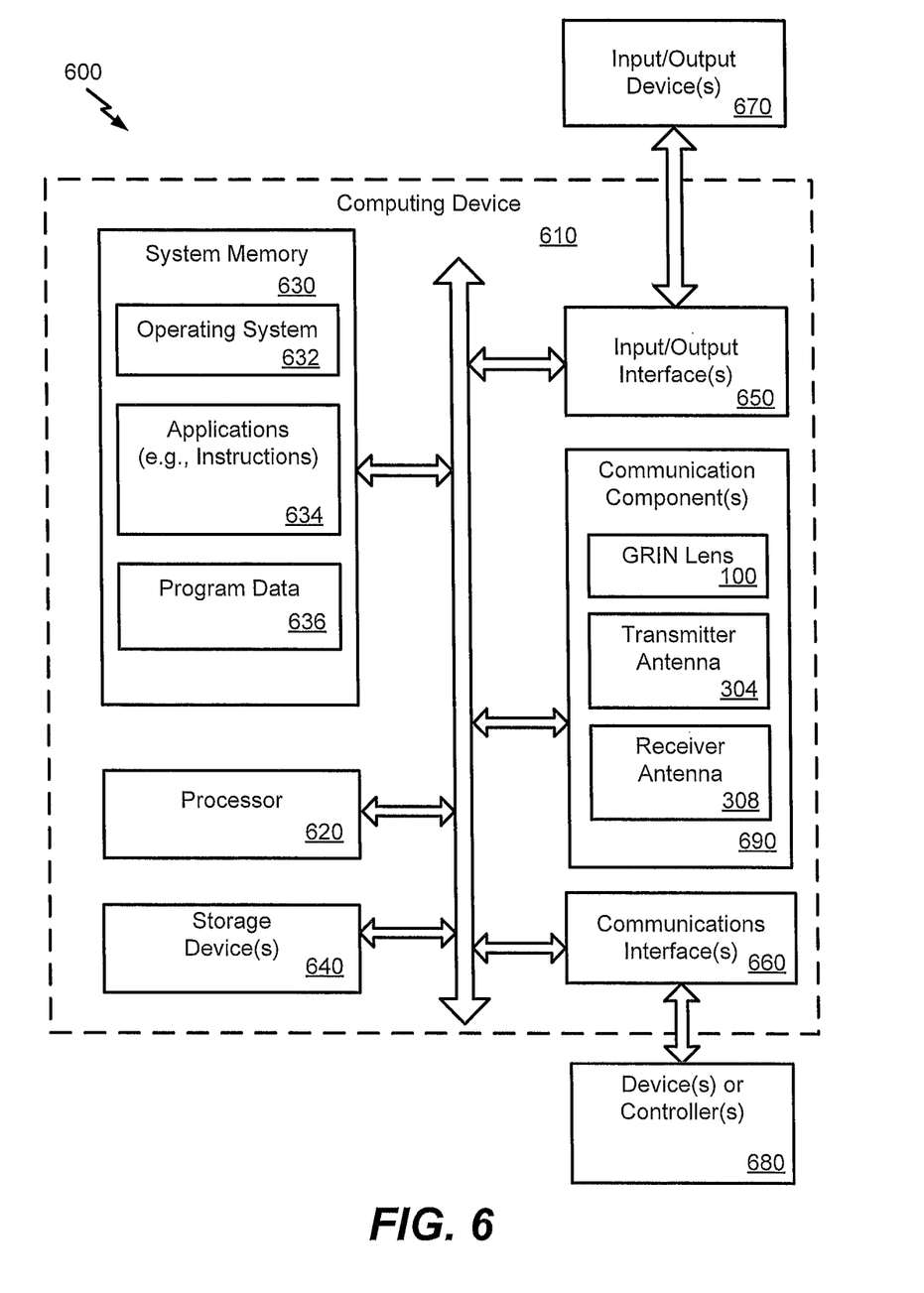
FIG. 6 is an illustration of a block diagram of a computing environment including a general purpose computing device configured to support embodiments of computer-implemented methods and computer-executable program instructions (or code) according to the present disclosure.

FIG. 6 is an illustration of a block diagram of a computing environment 600 including a general purpose computing device 610 configured to support embodiments of computer-implemented methods and computer-executable program instructions (or code) according to the present disclosure. For example, the computing device 610, or portions thereof, may execute instructions to initiate, perform, or control one or more operations of the method 500 of FIG. 5. The computing device 610, or portions thereof, may further execute instructions according to any of the methods described herein.

The computing device 610 may include one or more communication components 690. The one or more communication components 690 include the GRIN lens 100. In the example of FIG. 6, the one or more communication components 690 further include the transmitter antenna 304 and the receiver antenna 308.

The computing device 610 may include a processor 620. The processor 620 may communicate with the system memory 630, one or more storage devices 640, one or more input/output interfaces 650, one or more communications interfaces 660, or a combination thereof. The system memory 630 may include volatile memory devices (e.g., random access memory (RAM) devices), nonvolatile memory devices (e.g., read-only memory (ROM) devices, programmable read-only memory, and flash memory), or both. The system memory 630 may store an operating system 632, which may include a basic/input output system for booting the computing device 610 as well as a full operating system to enable the computing device 610 to interact with users, other programs, and other devices. The system memory 630 may store system (program) data 636.

The system memory 630 may include one or more applications 634 executable by the processor 620. As an example, the one or more applications 634 may include instructions executable by the processor 620 to initiate control, or perform one or more operations described herein, such as one or more operations of the method 500 of FIG. 5. As an illustrative example, the one or more applications 634 may include instructions executable by the processor 620 to generate control signals in connection with operation of the one or more communication components 690 (e.g., in connection with wireless communications in a wireless communication network). Alternatively or in addition, the instructions may be executable by the processor 620 to initiate, perform, or control one or more other operations.

The processor 620 may also communicate with one or more storage devices 640. For example, the one or more storage devices 640 may include nonvolatile storage devices, such as magnetic disks, optical disks, or flash memory devices. The storage devices 640 may include both removable and non-removable memory devices. The storage devices 640 may be configured to store an operating system, images of operating systems, applications, and program data. In a particular embodiment, the system memory 630, the storage devices 640, or both, include tangible computer-readable media.

The processor 620 may also communicate with one or more input/output interfaces 650 that enable the computing device 610 to communicate with one or more input/output devices 670 to facilitate user interaction. The processor 620 may detect interaction events based on user input received via the input/output interfaces 650. Additionally, the processor 620 may send a display to a display device via the input/output interfaces 650. The processor 620 may communicate with devices or controllers 680 via the one or more communications interfaces 660.

In an illustrative example, a non-transitory computer-readable storage medium (e.g., the system memory 630) includes instructions that, when executed by a processor (e.g., the processor 620), cause the processor to initiate, perform, or control operations. The operations include one or more operations described herein, such as one or more operations described with reference to the method 500 of FIG. 5.

Embodiments described above are illustrative and do not limit the disclosure. It is to be understood that numerous modifications and variations are possible in accordance with the principles of the present disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. An apparatus comprising:
a center portion; and
a plurality of spoke portions that are in contact with the center portion and that extend to a perimeter region, the plurality of spoke portions including at least a first monolithic spoke portion extending from the center portion to the perimeter region, wherein the first monolithic spoke portion has a first width at a first distance from the center portion and a second width at a second distance from the center portion, the second distance greater than the first distance, and wherein the first width is different than the second width, wherein the center portion and the plurality of spoke portions define a plurality of cavity regions among the plurality of spoke portions, and wherein the center portion, the plurality of spoke portions, and the plurality of cavity regions are included in a gradient index (GRIN) lens having a plurality of effective dielectric constants that are based on a radial distance from the center portion.

2. The apparatus of claim 1, further comprising an outer ring structure coupled to the plurality of spoke portions and defining the perimeter region.

3. The apparatus of claim 1, wherein a number of the plurality of spoke portions is related to a frequency associated with the GRIN lens.

4. The apparatus of claim 1, wherein the plurality of effective dielectric constants include a continuous range of effective dielectric constants.

5. The apparatus of claim 1, wherein the GRIN lens is further configured to focus electromagnetic radiation to transmit or to receive a far-field high-gain signal.

6. The apparatus of claim 1, further comprising an antenna configured to transmit or to receive an electromagnetic signal through the GRIN lens.

7. The apparatus of claim 1, wherein the second width is greater than the first width, and wherein the first monolithic spoke portion has a tapered profile that increases in width as a function of distance from the center portion.

8. The apparatus of claim 1, wherein the second width is less than the first width, and wherein the first monolithic spoke portion has a tapered profile that decreases in width as a function of distance from the center portion.

9. The apparatus of claim 1, wherein the first monolithic spoke portion further has a third width at a third distance from the center portion, the third distance greater than the second distance, wherein the second width is greater than the first width and is greater than the third width, and wherein the first monolithic spoke portion has a dual-tapered profile that increases in width as a function of distance from the center portion until a particular distance from the center portion and then decreases in width as a function of distance from the center portion.

10. The apparatus of claim 1, wherein the first monolithic spoke portion further has a third width at a third distance from the center portion, the third distance greater than the second distance, wherein the second width is less than the first width and is less than the third width, and wherein the first monolithic spoke portion has a reverse dual-tapered profile that decreases in width as a function of distance from the center portion until a particular distance from the center portion and then increases in width as a function of distance from the center portion.

11. A method comprising:

receiving an electromagnetic waveform at a gradient index (GRIN) lens; and modifying the electromagnetic waveform at the GRIN lens based on a plurality of effective dielectric constants that are based on a radial distance from a center portion of the GRIN lens and further based on a plurality of cavity regions defined by the center portion and a plurality of spoke portions of the GRIN lens, wherein the plurality of spoke portions include at least a first monolithic spoke portion extending from the center portion to a peripheral region of the GRIN lens, wherein the first monolithic spoke portion has a first width at a first distance from the center portion and a second width at a second distance from the center portion, the second distance greater than the first distance, and wherein the first width is different than the second width.

12. The method of claim 11, further comprising transmitting the electromagnetic waveform to a receiver antenna.

13. The method of claim 11, wherein the electromagnetic waveform is received from a transmitter antenna via a communication channel.

14. The method of claim 11, wherein the plurality of effective dielectric constants include a continuous range of effective dielectric constants.

15. The method of claim 11, wherein a number of the plurality of spoke portions is related to a frequency of the electromagnetic waveform.

16. An apparatus comprising:

a center portion; and a plurality of spoke portions that are in contact with the center portion and that extend to a perimeter region, wherein the center portion and the plurality of spoke portions define a plurality of cavity regions among the plurality of spoke portions, the plurality of cavity regions including at least a first monolithic cavity region extending from the center portion to the perimeter region, wherein the first monolithic cavity region has a first width at a first distance from the center portion and a second width at a second distance from the center portion, the second distance greater than the first distance, and wherein the first width is different than the second width, and wherein the center portion, the plurality of spoke portions, and the plurality of cavity regions are included in a gradient index (GRIN) lens having a plurality of effective dielectric constants that are based on a radial distance from the center portion.

17. The apparatus of claim 16, wherein the plurality of effective dielectric constants include a continuous range of effective dielectric constants based on tapered profiles of the plurality of spoke portions.

18. The apparatus of claim 16, wherein the GRIN lens is further configured to focus electromagnetic radiation to transmit or to receive a far-field high-gain signal.

19. The apparatus of claim 16, further comprising an antenna configured to transmit or to receive an electromagnetic signal through the GRIN lens.

20. The apparatus of claim 16, wherein the second width is greater than the first width, and wherein a spoke of the plurality of spoke portions has a tapered profile that increases in width as a function of distance from the center portion.

* * * * *